(12) United States Patent
Blake, III et al.

(10) Patent No.: US 7,100,939 B2
(45) Date of Patent: Sep. 5, 2006

(54) INFLATABLE CURTAIN ASSEMBLY

(75) Inventors: Thomas E. Blake, III, South Lyon, MI (US); Gary G. Gordon, Novi, MI (US); Steve Zofchak, Flint, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 10/606,257

(22) Filed: Jun. 25, 2003

(65) Prior Publication Data

US 2004/0012173 A1    Jan. 22, 2004

Related U.S. Application Data

(63) Continuation-in-part of application No. 09/804,918, filed on Mar. 13, 2001, now Pat. No. 6,736,421.

(51) Int. Cl.
*B60R 21/213* (2006.01)

(52) U.S. Cl. .................. 280/728.2; 280/730.2; 296/214

(58) Field of Classification Search ............ 280/728.2, 280/730.2; 296/214; 16/422, 425
See application file for complete search history.

(56) References Cited

U.S. PATENT DOCUMENTS

| | | | |
|---|---|---|---|
| 4,393,540 A | | 7/1983 | Yamamoto et al. |
| 4,582,443 A | | 4/1986 | Hegele |
| 4,593,430 A | | 6/1986 | Spangler et al. |
| 5,440,783 A | * | 8/1995 | Allardyce et al. ......... 16/110.1 |
| 5,791,683 A | | 8/1998 | Shibata et al. |
| 5,931,525 A | * | 8/1999 | Rickabus .................... 296/214 |
| 6,073,961 A | | 6/2000 | Bailey et al. |
| 6,079,735 A | | 6/2000 | Fallmann et al. |
| 6,082,761 A | | 7/2000 | Kato et al. |
| 6,149,185 A | | 11/2000 | White, Jr. et al. |
| 6,155,594 A | | 12/2000 | Ibe et al. |
| 6,173,990 B1 | | 1/2001 | Nakajima et al. |
| 6,227,561 B1 | | 5/2001 | Jost et al. |
| 6,238,438 B1 | | 5/2001 | Fischer et al. |
| 6,257,616 B1 | | 7/2001 | Nowak et al. |
| 6,340,169 B1 | * | 1/2002 | Tietze ...................... 280/728.2 |
| 6,364,343 B1 | * | 4/2002 | Slota et al. ............... 280/728.2 |
| 6,375,214 B1 | * | 4/2002 | Nishikaji .................. 280/728.2 |
| 6,386,581 B1 | * | 5/2002 | Ohno ........................ 280/735 |
| 6,450,529 B1 | * | 9/2002 | Kalandek et al. ........ 280/730.2 |

(Continued)

FOREIGN PATENT DOCUMENTS

DE            19841340 A1       3/2000

(Continued)

*Primary Examiner*—Paul N. Dickson
*Assistant Examiner*—Laura B. Rosenberg
(74) *Attorney, Agent, or Firm*—Tarolli, Sundheim, Covell & Tummino LLP

(57) ABSTRACT

An apparatus (10) includes a modular headliner assembly (220) for a vehicle (12) having a side structure (16) and a roof (18). The headliner assembly (220) includes a headliner (170), an inflatable curtain (14), a fill tube (22), and a support device (40) that clamps around the fill tube to connect the tube and the curtain to the support device. A grab handle (150) has a portion extendable through the headliner (170) and into the support device (40) to connect the grab handle and the support device to the headliner. The apparatus (10) also includes a first connector (122) for connecting the support device (40) to the vehicle (12) to initially connect the headliner assembly (220) to the vehicle. The apparatus (10) further includes a second connector (180) extendable through the support device (40) and the grab handle (150) to fixedly connect the headliner assembly (220) to the vehicle.

22 Claims, 7 Drawing Sheets

U.S. PATENT DOCUMENTS

| | | | |
|---|---|---|---|
| 6,485,048 B1 * | 11/2002 | Tajima et al. | 280/728.2 |
| 6,540,251 B1 * | 4/2003 | LeVey et al. | 280/728.2 |
| 2002/0125705 A1 * | 9/2002 | Wong et al. | 280/743.2 |
| 2003/0164607 A1 * | 9/2003 | Ronne et al. | 280/728.2 |

FOREIGN PATENT DOCUMENTS

| | | |
|---|---|---|
| WO | WO 99/51457 | 10/1999 |

\* cited by examiner

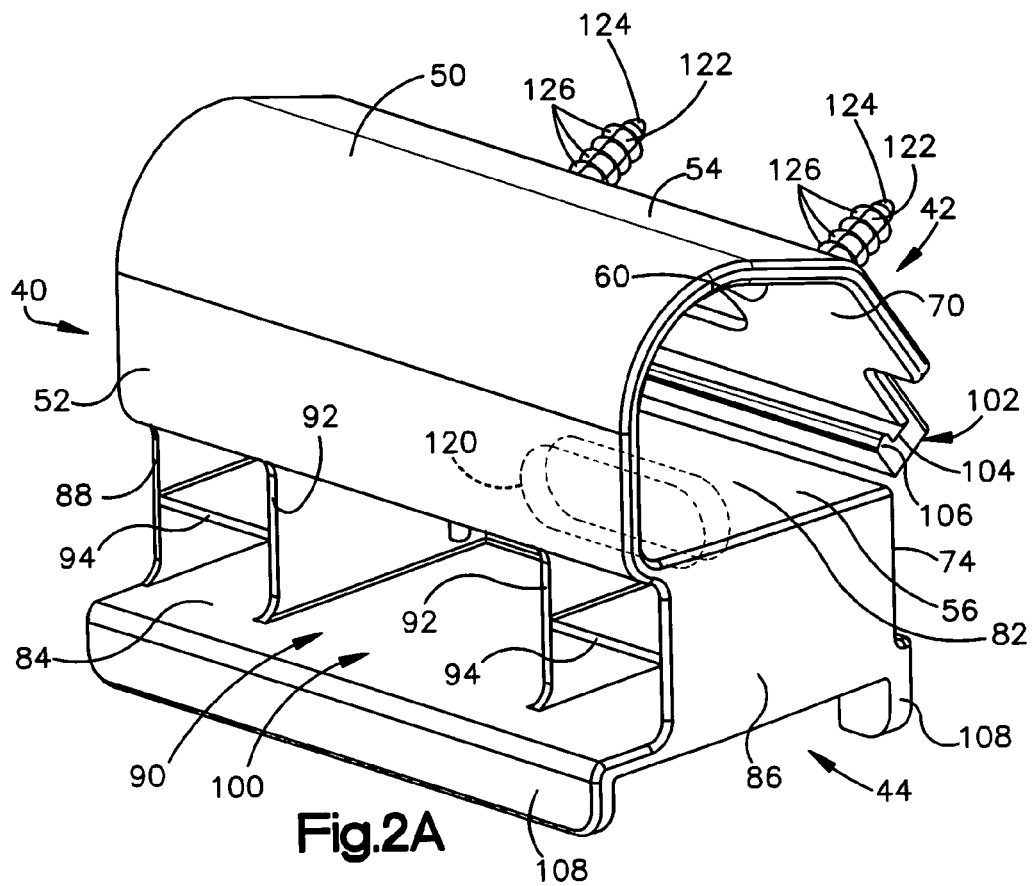
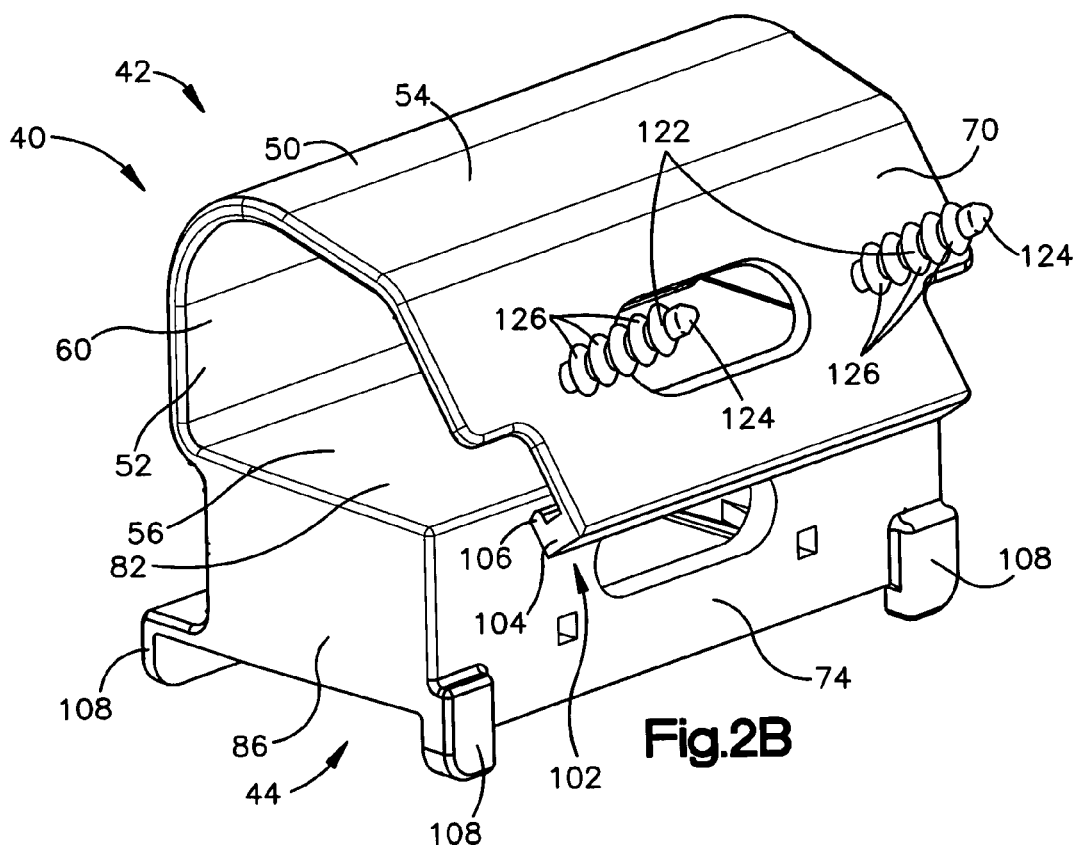

INFLATABLE CURTAIN ASSEMBLY

RELATED APPLICATIONS

This application is a continuation-in-part of U.S. patent application Ser. No. 09/804,918, filed Mar. 13, 2002, now U.S. Pat. No. 6,736,421 B1.

FIELD OF THE INVENTION

The present invention relates to an inflatable curtain that is inflatable between a side structure of a vehicle and a vehicle occupant. In particular, the present invention relates to a modular headliner assembly that includes an inflatable curtain.

BACKGROUND OF THE INVENTION

It is known to inflate an inflatable curtain to help protect a vehicle occupant in the event of a vehicle collision and/or a vehicle rollover. Such inflatable curtains are inflatable from the roof of the vehicle between a vehicle occupant and a side structure of the vehicle. The inflatable curtain is inflated from a deflated condition by inflation fluid directed from an inflator to the inflatable curtain through a fill tube.

Known inflatable curtains are stored in a folded, deflated condition in a housing. A support device such as a clamp or bracket is used to connect the fill tube and the inflatable curtain to the vehicle via fasteners. It is also known to provide a grab handle in a vehicle. Known grab handles are typically connected to the vehicle via fasteners.

SUMMARY OF THE INVENTION

The present invention relates to an apparatus which includes a modular headliner assembly for a vehicle having a side structure and a roof. The headliner assembly includes a headliner and an inflatable vehicle occupant protection device inflatable away from the vehicle roof into a position between the side structure of the vehicle and the vehicle occupant. The headliner assembly also includes a fill tube having a portion located in the protection device and a support device having a portion adapted to clamp around a portion of the fill tube to connect the fill tube and the protection device to the support device. The headliner assembly further includes a grab handle having a portion extendable through the headliner and into the support device. The grab handle releasably interconnects with the support device to connect the grab handle and the support device, and subsequently the fill tube and protection device, to the headliner. The apparatus also includes a first connector for connecting the support device to the vehicle to initially connect the headliner assembly to the vehicle. The apparatus further includes a second connector extendable through the support device and the grab handle to fixedly connect the headliner assembly to the vehicle.

The present invention also relates to an apparatus for helping to protect an occupant of a vehicle having a side structure and a roof. The apparatus includes a headliner, an inflatable vehicle occupant protection device inflatable away from the vehicle roof into a position between the side structure of the vehicle and the vehicle occupant, and a fill tube having a portion located in the protection device. A support device has a portion that clamps around a portion of the fill tube. A grab handle has a portion adapted to extend through the headliner and interconnect with the support device to connect the headliner, grab handle, support device, and subsequently the fill tube and protection device, with each other. A fastener extends through the grab handle and the support device to connect the grab handle, support device, headliner, fill tube, and device to the vehicle.

The present invention also relates to a headliner assembly for a vehicle. The headliner assembly includes a headliner, an inflatable side curtain, and a fill tube for delivering inflation fluid to said side curtain. A support device has a portion adapted to clamp around a portion of the fill tube to connect the fill tube and the side curtain to the support device. A grab handle has a portion extendable through the headliner and into the support device. The grab handle is adapted to releasably interconnect with the support device to connect the grab handle and the support device, and subsequently the fill tube and protection device, to the headliner. A first connector connects the support device to the vehicle to initially connect the support device, grab handle, headliner, fill tube, and side curtain to the vehicle. A second connector extends through the support device and the grab handle to fixedly connect the support device, grab handle, headliner, fill tube and side curtain to the vehicle.

The present invention further relates to an apparatus for a vehicle. The apparatus includes a headliner, an inflatable side curtain, and a grab handle assembled together as a module. The apparatus also includes a push-in connector for initially connecting the module to the vehicle. The apparatus further includes a threaded connector extendable through the grab handle to fixedly connect the module to the vehicle. The threaded connector and the grab handle are removable to release the headliner from the vehicle. The push-in connector maintains the side curtain connected to the vehicle.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 2a and 2b are perspective views of a support device which forms a portion of the apparatus of FIG. 1, depicting the support device in an open condition;

DESCRIPTION OF PREFERRED EMBODIMENTS

Figure 1:
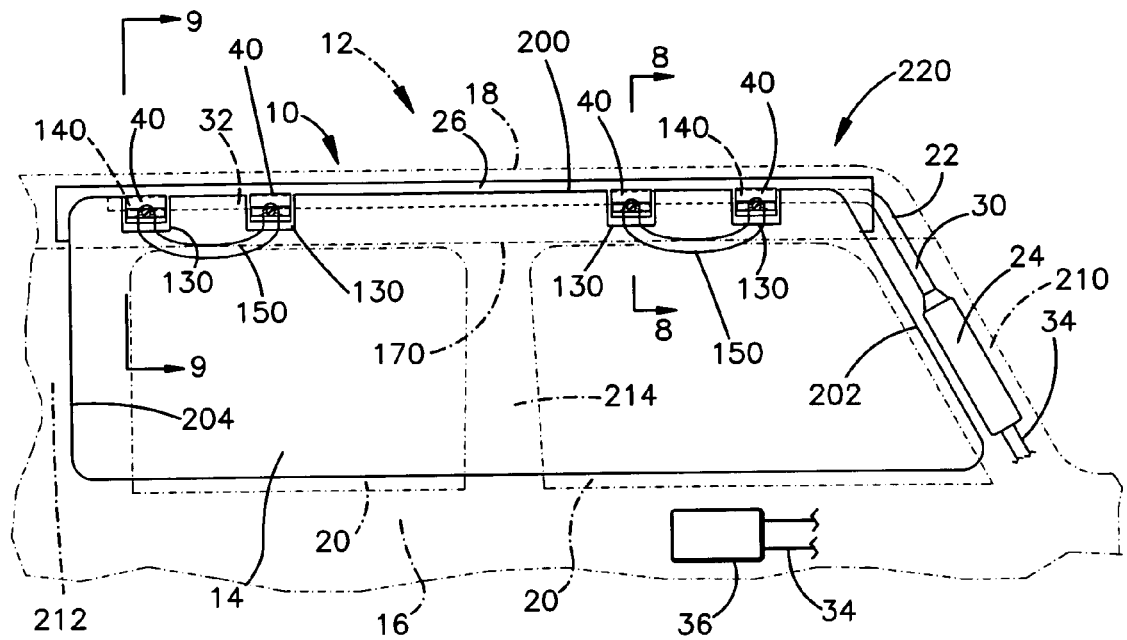
FIG. 1 is a schematic representation of a side elevation of an apparatus for helping to protect a vehicle occupant, according to the present invention.

As representative of the present invention, an apparatus 10 helps to protect an occupant of a vehicle 12. As shown in FIG. 1, the apparatus 10 includes an inflatable vehicle occupant protection device in the form of an inflatable curtain 14 that is mounted adjacent the side structure 16 of the vehicle 12 and a roof 18 of the vehicle. The side structure 16 of the vehicle 12 includes side windows 20. An inflator 24 is connected in fluid communication with the inflatable curtain 14 through a fill tube 22.

The fill tube 22 has a first end portion 30 for receiving fluid from the inflator 24. The fill tube 22 has a second end portion 32 disposed in the inflatable curtain 14. The second end portion 32 of the fill tube 22 has a plurality of openings (not shown) that provide fluid communication between the fill tube 22 and the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 that stores the inflatable curtain 14 in a deflated condition (not shown). The fill tube 22, the deflated inflatable curtain 14, and housing 26 have an elongated configuration and extend along the vehicle roof 18 and along the side structure 16 of the vehicle 12 above the side windows 20.

The vehicle 12 includes a sensor mechanism 36 (shown schematically in FIG. 1) for sensing a side impact to the vehicle 12 and/or a rollover of the vehicle 12. In the event of a side impact to the vehicle 12 of a magnitude greater than a predetermined threshold value, the sensor mechanism 36 causes an electrical signal to be sent over lead wires 34 to the inflator 24. The electrical signal causes the inflator 24 to be actuated in a known manner. The inflator 24 discharges fluid under pressure into the fill tube 22. The fill tube 22 directs the fluid into the inflatable curtain 14. The inflatable curtain 14 inflates under the pressure of the inflation fluid into the position of FIG. 1, between the side structure 16 of the vehicle 12 and any occupants of the vehicle 12.

The inflatable curtain 14, when inflated, extends along the side structure 16 of the vehicle 12 and is positioned between the side structure and any occupant of the vehicle. When the inflatable curtain 14 is in the inflated condition, an upper edge 200 of the curtain is positioned adjacent the intersection of the roof 18 and the side structure 16 of the vehicle 12. A front edge 202 of the inflatable curtain 14 is positioned adjacent an A pillar 210 of the vehicle 12. A rear edge 204 of the inflatable curtain 14 is positioned adjacent a C pillar 212 of the vehicle 12. The inflatable curtain 14 extends between the A pillar 210 and the C pillar 212 of the vehicle 12 and overlies at least a portion of the A pillar, C pillar, and a B pillar 214 of the vehicle.

It will be recognized by those skilled in the art that the inflatable curtain may have alternative configurations. For example, in the illustrated embodiment, the inflatable curtain 14 extends between the A pillar 210 and the C pillar 212 of the vehicle 12. The inflatable curtain 14 could, however, extend between the A pillar 210 and the B pillar 214 only or between the B pillar and the C pillar 212 only. Also, the inflatable curtain 14 could, when inflated, extend between the A pillar 210 and a D pillar (not shown) of the vehicle 12.

The inflatable curtain 14, when inflated, helps to protect a vehicle occupant in the event of a vehicle rollover or a side impact to the vehicle 12. The inflatable curtain 14, when inflated, helps to absorb the energy of impacts and helps to distribute the impact energy over a large area of the curtain.

Figure 3:
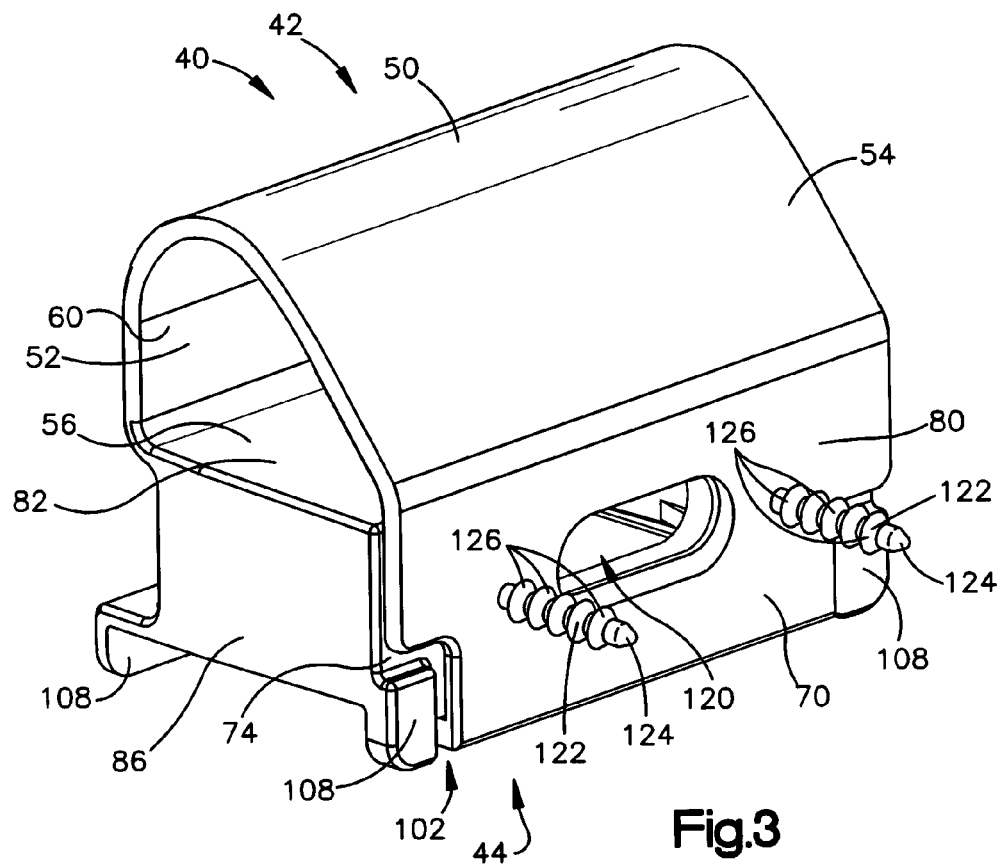
FIG. 3 is a perspective view of the support device of FIGS. 2a and 2b depicting the support device in a closed condition.

A plurality of support devices 40 connect the inflatable curtain 14 and fill tube 22 to the side structure 16 of the vehicle 12. The support devices 40 are operable from an open position illustrated in FIGS. 2a and 2b to a closed position illustrated in FIG. 3 to connect the support device to the fill tube 22. As illustrated in FIGS. 2a, 2b and 3, each support device 40 consists of a clamping portion 42 and a fastening portion 44. Preferably, the support device 40 is constructed of a single piece of high-strength plastic material that is molded to form the clamping portion 42 and fastening portion 44. Those skilled in the art, however, will recognize that alternative high-strength materials, such as metal, and alternative designs, such as a multi-piece construction, may also be suitable for constructing the support device 40. For example, the support device 40 could be formed of a single piece of metal that is cut in a predetermined pattern and folded or bent to form the support device.

The clamping portion 42 includes an arc-shaped end portion 50 and first and second side walls 52 and 54 that extend from opposite ends of the end portion. A flat bottom portion 56 of the clamping portion 42 extends generally perpendicularly from the first side wall 52 to adjacent the second side wall 54 when the support device 40 is in the closed position of FIG. 3. The end portion 50, first and second side walls 52 and 54, and bottom portion 56 form an inner clamping surface 60 (FIGS. 2a, 2b and 3) of the clamping portion 42.

A first clamp flange 70 extends from the second side wall 54 in a direction perpendicular to the bottom portion 56. A second clamp flange 74 extends from an end of the bottom portion 56 adjacent the second side wall 54 of the end portion 50 in a direction perpendicular to the bottom portion. The first and second clamp flanges 70 and 74 are positioned in an adjacent and overlying relationship when the support device 40 is in the closed position of FIG. 3.

The fastening portion 44 includes a rectangular bottom wall 80 formed by the overlying first and second clamp flanges 70 and 74. First and second opposite side walls 82 and 84 and first and second opposing end walls 86 and 88 extend perpendicularly from the bottom wall 80 to form a chamber 90 of the support device 40. The first side wall 82 is defined by the bottom portion 56 of the clamping portion 50. The second side wall 84 (FIG. 2a) extends perpendicularly from the second clamp flange 74 in a direction parallel to the first side wall 82. A pair of spaced first reinforcing walls 92 extend from the fist side wall 82 to the second side wall 84. Second reinforcing walls 94 extend perpendicularly from the first reinforcing walls 92 to the end walls 86 and 88, respectively. The first reinforcing walls 92 and the first and second side walls 82 and 84 help define a fastener receiving chamber 100 in the chamber 90.

A terminal end portion of the first clamp flange 70 forms a latch portion 102 of the support device 40. The latch portion 102 includes a base member 104 that extends generally perpendicularly from the first clamp flange 70 and a latch member 106 that extends perpendicularly from the base member 104. Housing support flanges 108 extend perpendicularly from longitudinal edges of the second side wall 84 in a direction away from the chamber 90.

An elongated fastener opening 120 extends through the bottom wall 80 of the chamber 90, i.e., through the first and second clamp flanges 70 and 74. The fastener opening 120 is preferably centered between the first and second side walls 82 and 84 and the first and second end walls 86 and 88.

The support device 40 also includes push-in fasteners 122 (see FIGS. 2–3) that project from the bottom wall 80 of the fastening device. In the illustrated embodiment, the push-in fasteners 122 comprise what are commonly referred to in the art as Xmas tree or fir tree fasteners. The push-in fasteners 122 could, however, comprise any suitable type of push-in fastener. The push-in fasteners 122 include a shaft 124 and a plurality of annular ribs 126 that project radially from the shaft at an acute angle relative to the shaft toward the bottom wall 80.

In the illustrated embodiment, each support device 40 includes two push-in fasteners 122 that extend from the first clamp flange 70 at positions near opposite ends of the aperture 120. The support devices 40 could, however, include a greater number or fewer of the push-in fasteners 122. Also, the push-in fasteners 122 could extend from different positions on the first clamp flange 70 or could extend from a different location on the support device 40, such as the second clamp flange 74. In this instance, the first clamp flange 70 may include an aperture or cut away portion through which the push-in fasteners could project.

Also, as shown in the illustrated embodiment, the push-in fasteners 122 are formed as a single piece of material with the support device 40. In this configuration, the push-in fasteners 122 could be molded integrally with the support device (e.g., the first clamp flange 70). The support device 40, including the push-in fasteners 122, would thus be formed as a single piece of plastic material. It will be appreciated, however, that the push-in fasteners 122 could be formed as a separate piece for assembly with the support device 40 and could thus be formed from a material different from that of the support device.

As illustrated in FIG. 1, the inflatable curtain 14 includes cutout portions 130 spaced along its length. Each cutout portion 130 extends entirely through the inflatable curtain 14. The perimeter of each cutout portion 130 is sealed by means (not shown), such as stitching or an adhesive to help block leakage of inflation fluid through the cutout portions when the inflatable curtain 14 is inflated.

The fill tube 22 (FIGS. 4 and 5) is generally cylindrical in shape and includes a series of clamp sections 140 spaced along its length. The cylindrical fill tube 22 is flattened on one side along the extent of each clamping section 140. Thus, the fill tube 22 has an arc-shaped portion 142 and a flat bottom portion 144 along the length of each clamp section 140. The spacing of the cutout portions 130 (FIG. 1) on the inflatable curtain 14 is equidistant with the spacing of the clamp sections 140 on the fill tube 22. The cutout portions 130 are thus positioned adjacent the clamp sections 140 when the fill tube 22 is fully inserted into the inflatable curtain 14.

As illustrated in FIG. 1, the apparatus 10 also includes grab handles 150 that are spaced apart along the length of the vehicle 12. In the embodiment illustrated in FIG. 1, there are two such grab handles 150. One of the grab handles 150 is positioned above the forward vehicle side window 20 of the vehicle 12, and the other grab handle is positioned above the rearward side window of the vehicle. Each grab handle 150 (FIG. 6) has a first end 152 and an opposite second end 154. An anchor portion 156 (FIGS. 6 and 7) extends from each of the first and second ends 152 and 154 of the grab handle 150. Each of the anchor portions 156 include a latch portions 160 positioned near the end of the anchor portion on opposite sides of the anchor portion. As illustrated in FIG. 7, the latch portions 160 each include a guide surface 162 and a latch surface 164.

Figure 4:
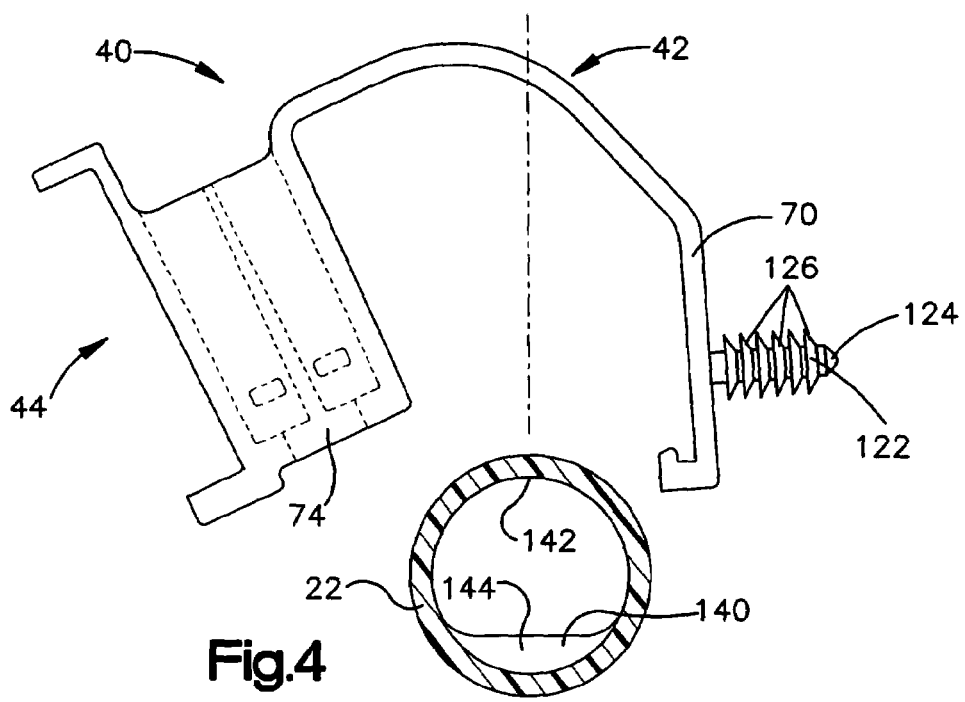
FIG. 4 is a sectional view of a portion of the apparatus of FIG. 1 depicting the assembly of certain parts of the apparatus.

Assembly of the fill tube 22, the inflatable curtain 14, support devices 40, grab handles 150, and headliner is performed prior to installation in the vehicle 12. The fill tube 22 is inserted into the inflatable curtain 14. As illustrated in FIG. 4, the first and second clamp flanges 70 and 74 of the support device 40 are spaced apart, thus placing the support device in the open position. The clamping portion 42 of the support device 40 receives the fill tube 22.

Figure 5:
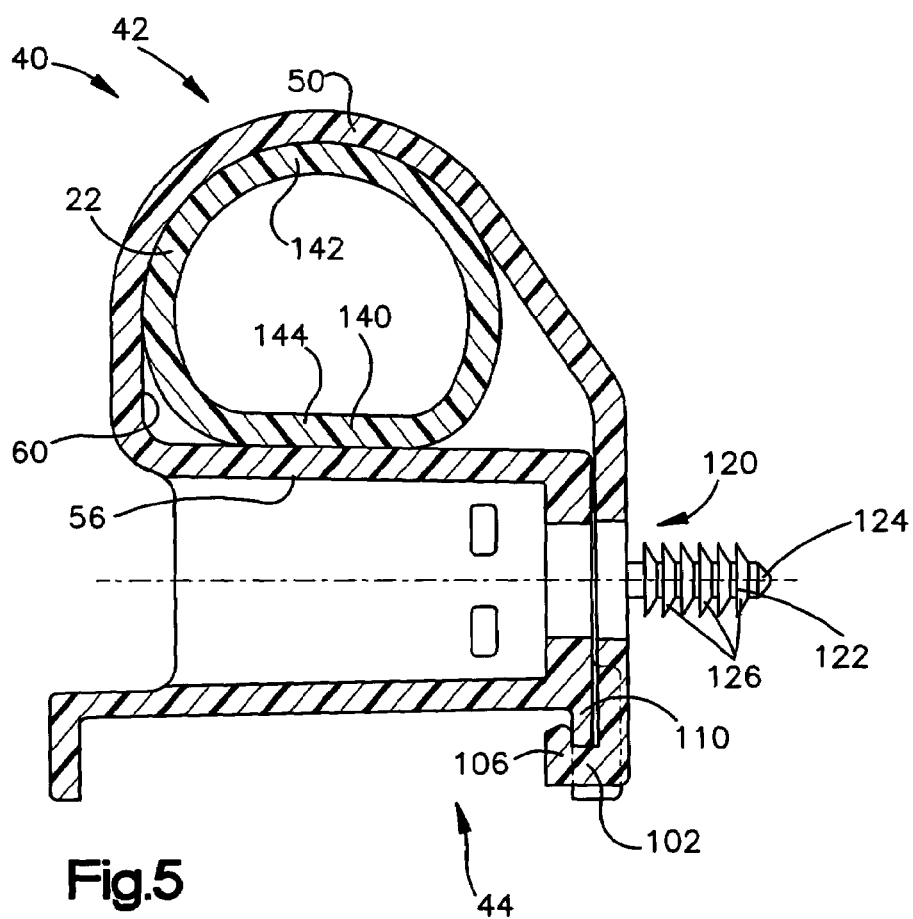
FIG. 5 is a sectional view of a portion of the apparatus of FIG. 1 showing certain parts assembled.

The clamp section 140 of the fill tube 22 is positioned within the clamping portion 42. Once the fill tube 22 is inserted into the clamping portion 42, as indicated by the dot-dash line in FIG. 4, the first and second clamp flanges 70 and 74 are moved together, thus placing the support device in the closed position. This is illustrated in FIG. 5. When the support device 40 is in the closed position, the arc-shaped end portion 50 (FIG. 5) of the clamping portion 42 is positioned adjacent the arc-shaped portion 142 of the clamp section 140. The bottom portion 56 of the clamping portion 42 is positioned adjacent the bottom portion 144 of the clamp section 140.

When the first and second clamp flanges 70 and 74 are moved together, they become positioned adjacent one another. As the first and second clamp flanges 70 and 74 of the fastening portion 44 are drawn together, the latch portion 102 receives a longitudinal edge 110 of the second clamp flange 74. The latch member 106 engages the longitudinal edge 110 of the second clamp flange 74 to lock the support device 40 in the closed position. This causes a clamping force to be applied to the fill tube 22 by the inner clamping surface 60 of the clamping portion 42. The support device 40 is thus secured to the fill tube 22. The cutout portions 130 leave the support devices 40, particularly the chamber 90 and the fastener receiving chamber 100, unobstructed by the inflatable curtain 14.

Figure 8:
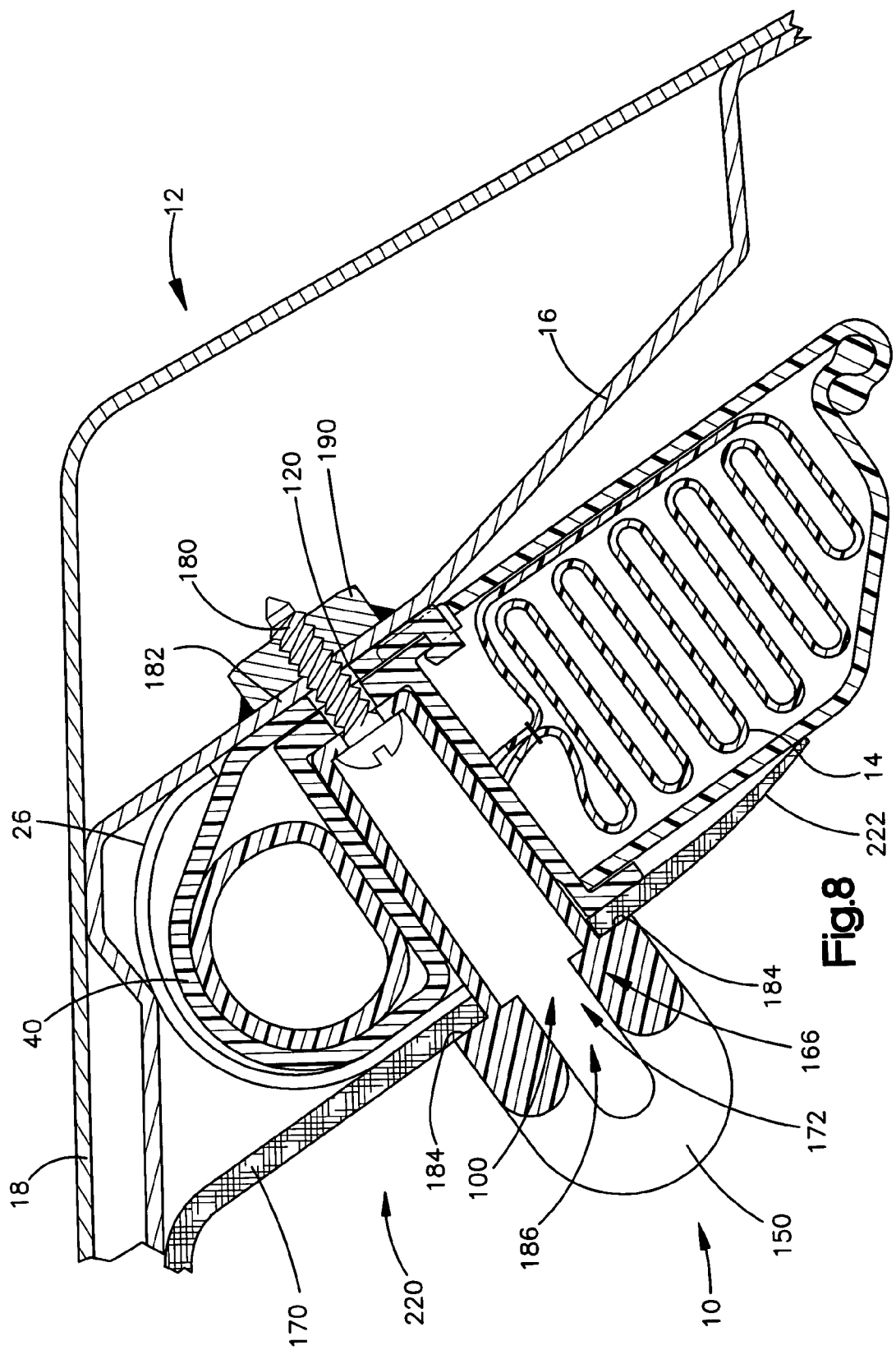
FIG. 8 is a sectional view of the apparatus taken generally along line 8—8 in FIG. 1.

Referring now to FIG. 8, the housing 26 is positioned around the inflatable curtain 14, fill tube 22, and support device 40. The housing support flanges 108 of each support device 40 engage the housing 26 and help to maintain its position relative to the support device 40. The housing 26 is cut away at locations 166 along its length. The spacing of the cut away locations 166 of the housing 26 is such that the fastener receiving chambers 100 of the support devices 40 are exposed at spaced locations along the length of the housing. A headliner 170 of the vehicle 12 overlies the housing 26 and the support device 40, as well as the inflatable curtain 14 and the fill tube 22.

Figure 6:
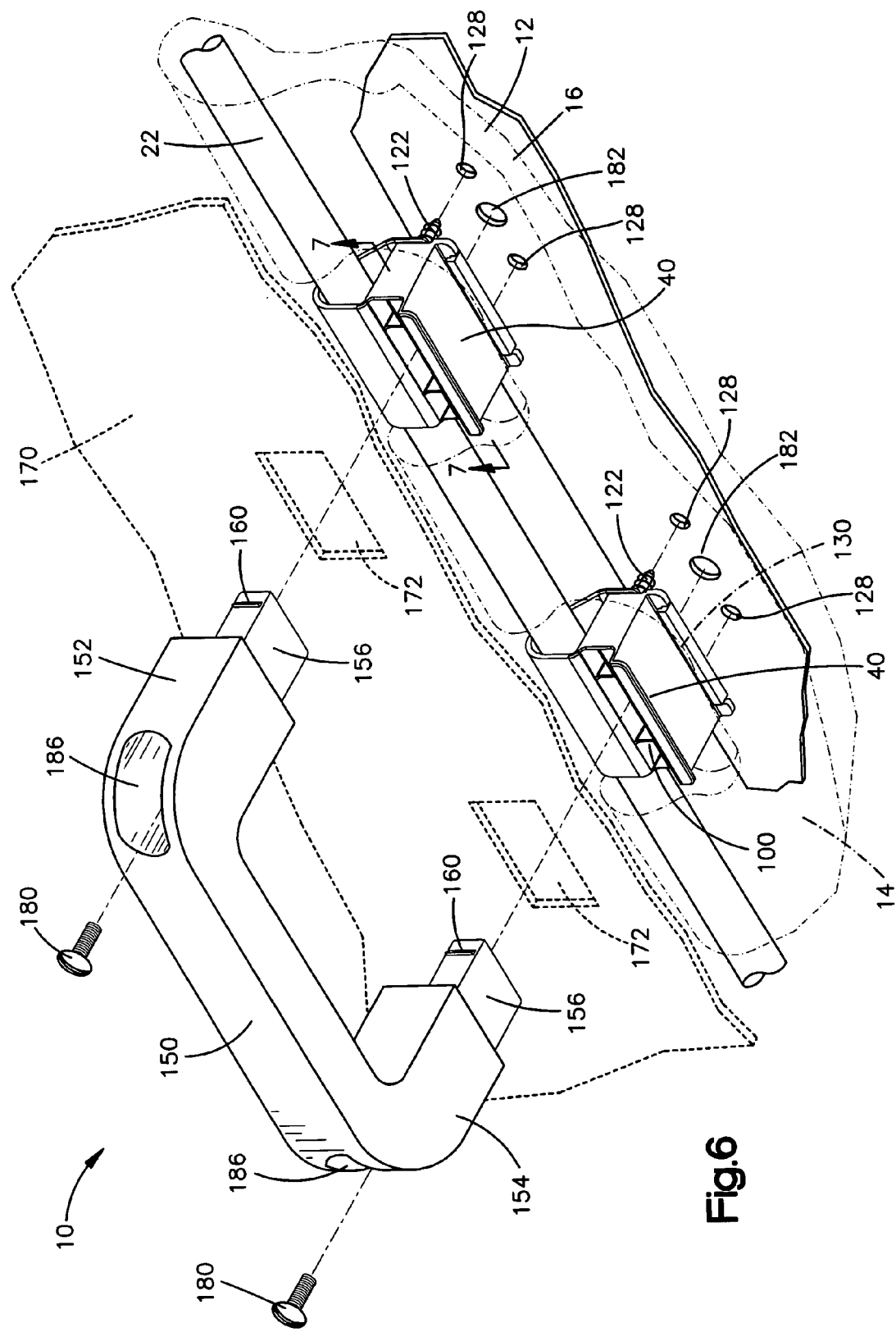
FIG. 6 is an perspective view of the apparatus of FIG. 1 depicting the assembly of the apparatus of FIG. 1.
Figure 7:
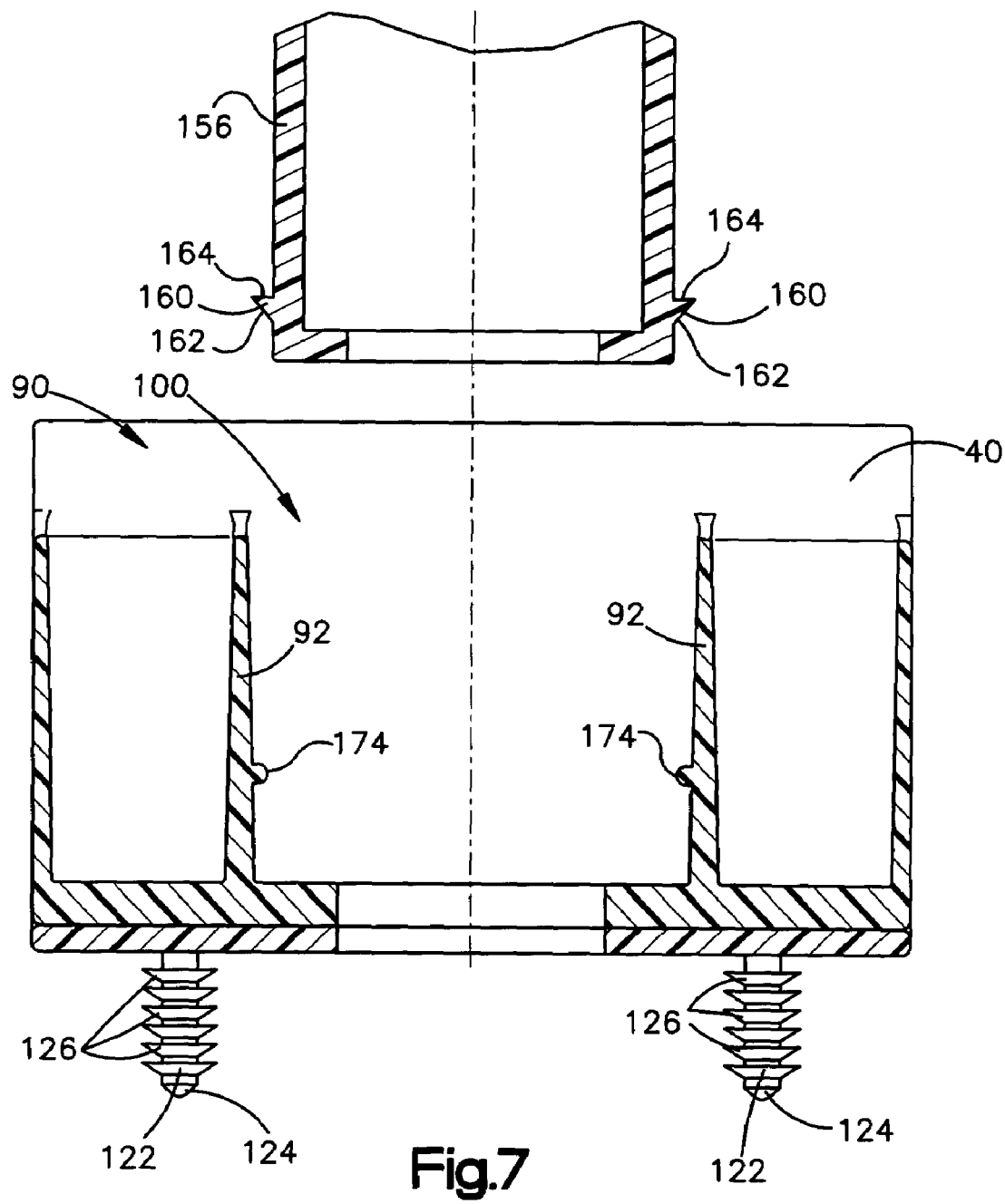
FIG. 7 is a sectional view of a portion of the apparatus taken generally along line 7—7 in FIG. 6, with certain parts omitted.

As illustrated in FIG. 6, the first and second ends 152 and 154 of the grab handles 150 are associated with respective support devices 40. Referring now to FIGS. 5–7, the anchor portions 156 of the grab handle 150 are inserted through respective apertures 172 in the headliner 170 and extend into the fastener receiving chamber 100 of the respective support devices 40. The rectangular dimensions of the anchor portions 156 form a close fit with the rectangular dimensions of the fastener receiving chamber 100. As the anchor portions 156 are inserted into the fastener receiving chamber 100, the guide surfaces 162 (FIG. 7) of the latch portions 160 engage the first reinforcing side walls 92. Depending on the dimensional tolerances between the anchor portions 156 and the fastener receiving chambers 100, this may cause the anchor portions and/or the fastener receiving chambers 100 to deflect as the anchor portions enter the respective fastener receiving chambers.

As the anchor portions 156 are inserted into the respective fastener receiving chambers 100, the latch portions 160 of each anchor portion reach respective dentations 174 that protrude from the first reinforcing walls 92. The resiliency of the material used to construct the anchor portions 156 and the support device 40 causes the latch portions 160 to "snap" around the dentations 174. The latch surfaces 164 of the latch portions 160 engage the dentations 174, which helps to retain the anchor portions 156 in the fastener receiving chamber 100. The anchor portions 156 thus connect the grab handle 150 to the support device 40. The latch portions 160 could have a more rounded configuration to facilitate easier removal of the grab handles 150.

Figure 9:
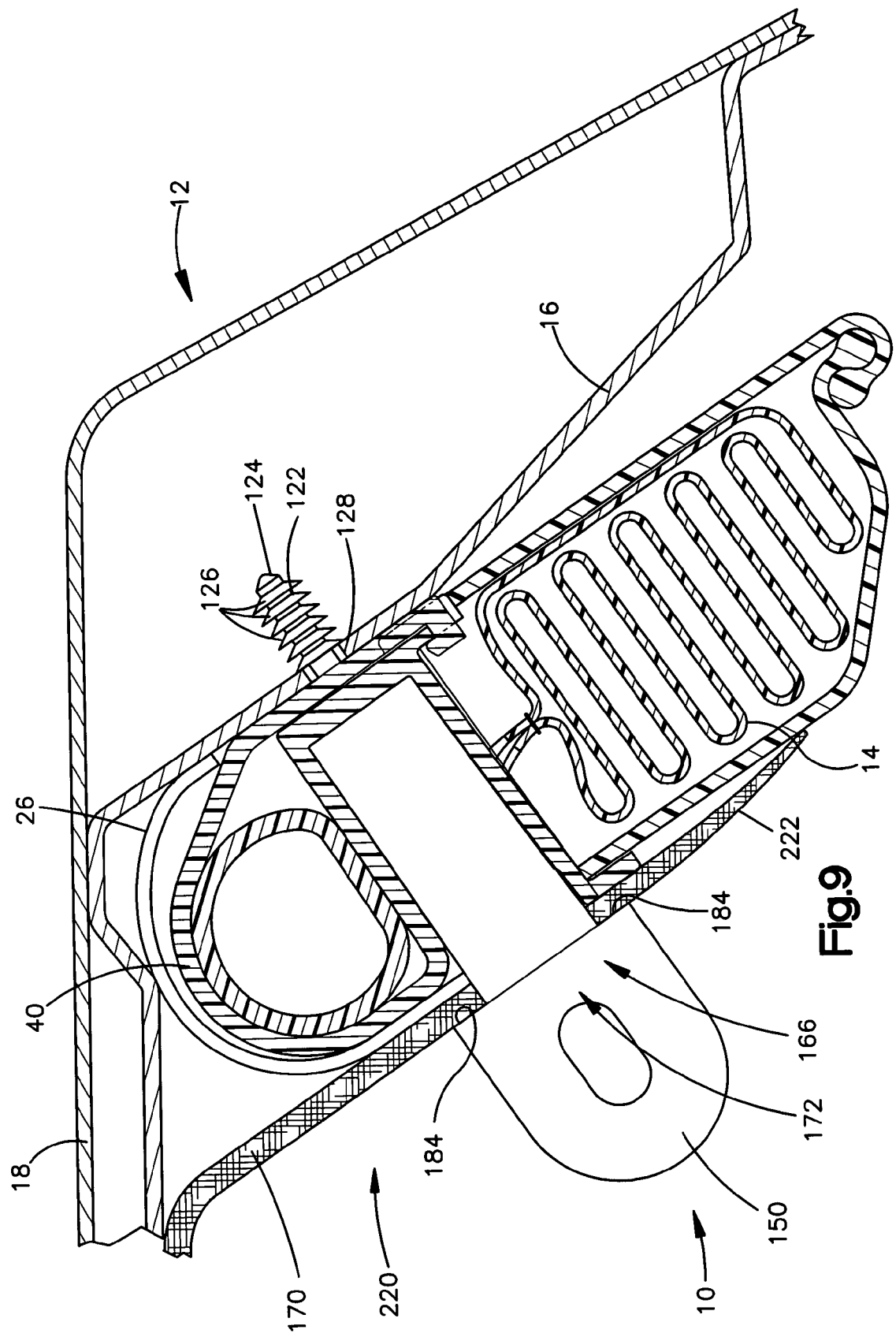
FIG. 9 is a sectional view of the apparatus taken generally along line 9—9 in FIG. 1.

Referring to FIGS. 8 and 9, when the grab handle 150 is connected to the support device 40, portions 184 of the grab handle overlie the headliner 170. The portions 184 impinge the headliner 170 between the grab handle 150 and the support device 40 and between the grab handle and the housing 26 and thus form a modular headliner assembly 220. The modular headliner assembly 220 comprises the assemblage of the inflatable curtain 14, fill tube 22, housing 26, support devices 40, and grab handles 150. The modular headliner assembly 220 also includes the inflator 24, which is connected to the fill tube 24. According to the present invention, the modular headliner assembly 220 is installable in the vehicle 12 as a single unit. The modular headliner assembly 220 thus may be pre-assembled at a first location and shipped to a second location, different from the first location, for installation in the vehicle 12.

It will be appreciated that the vehicle 12 may include an inflatable curtain 14 on each side (i.e., on the driver side and on the passenger side) of the vehicle. The modular headliner assembly 220 would thus include four support devices 40, a fill tube 22, an inflatable curtain 14, an inflator 24, and two grab handles 150 positioned along lateral edge portions 222 of the headliner 170 on the driver side of the vehicle. The modular headliner assembly 220 would also include four support devices 40, a fill tube 22, an inflatable curtain 14, an inflator 24, and two grab handles 150 positioned along lateral edge portions 222 of the headliner 170 on the passenger side of the vehicle. Thus, in the illustrated embodiment, the apparatus 10 includes four headliner apertures 172, four cutout portions 130, four clamping portions 140, and four support devices 40 spaced along each of the lateral edge portions 222.

The assembled modular headliner assembly 220 is located in a desired position relative to the side structure 16 and roof 18 of the vehicle 12. Once in the desired position, the support devices are initially connected to the vehicle 12 via the push-in fasteners 122. The push-in fasteners 122 allow for initial installation of the modular headliner assembly 220 in the vehicle 12 by placing the headliner assembly in the proper position and "pushing in." No tools or separate fasteners are required for initial installation of the modular headliner assembly 220. The installer(s) thus are not required to free-up their hands to use tools or the like for the initial installation.

As shown in FIGS. 6 and 9, the push-in fasteners 122 are inserted into apertures 128 in the side structure 16 to initially connect the headliner assembly 220 to the vehicle 12. As the fasteners 122 are pushed into the apertures 128, the ribs 126 (FIG. 9) of the fastener deflect towards the fastener shaft 124, thus allowing the fastener to pass through the aperture. Once through the apertures 128, the ribs 126 spring back towards their normal resting position relative to the shaft 124. If the push-in fasteners 122 are urged back out of their apertures 128, the ribs 126 are deflected away from the shaft 124 and create an interference with their respective aperture. This helps prevent the push-in fasteners 122 from being pulled out of the apertures 128 and thus helps secure the modular headliner assembly 220 in the vehicle 12.

Once the modular headliner assembly 220 is initially installed in the vehicle 12 via the push-in fasteners 122, the headliner assembly is fixedly connected to the vehicle via threaded fasteners 180, such as a screws. The threaded fasteners 180 fixedly connect the grab handles 150 and support devices 40 to the vehicle 12 and thus fixedly connect the modular headliner assembly 220 to the vehicle. As illustrated in FIGS. 6 and 8, the threaded fasteners 180 are inserted into chambers 186 in the grab handles 150, into the fastener receiving chamber 100 of the support devices 40, and through the fastener opening 120 in the bottom wall 80.

The threaded fasteners 180 may be separate from the modular headliner assembly 220 or they may be included as a pre-assembled part of the assembly. In the later instance, the threaded fasteners 180 could, for example, be partially threaded into or "tapped" into the grab handle 150 and/or support device 40. Thus, once the modular headliner assembly 220 is initially installed in the vehicle 12, the threaded fasteners 180 are prepositioned for fastening with the appropriate tool.

The fastener opening 120 is aligned with a location 182, such as an opening, in the side structure 16 of the vehicle 12 to receive the threaded fastener 180. The location 182 may include a threaded stud 190 (FIG. 8) for receiving the fastener 180. The threaded fastener 180 connects the grab handles 150 and support device 40 to the side structure 16 and thus fixedly connects the modular headliner assembly 220 to the vehicle 12.

As a feature of the present invention, the combination of the push-in fasteners 122 and the threaded fasteners 180 allows for post-installation removal of the headliner 170 without removing the inflatable curtain 14, fill tube 22, inflator 24, and housing 26. The threaded fasteners 180 are unscrewed and the grab handles 150 are removed. Removal of the grab handles 150 may require pulling or otherwise exerting a force that overcomes the retentive forces created by the engagement between the latch portions 160 (see FIG. 7) and the dentations 174. Once the grab handles 150 are removed, the headliner 170 is released and can also be removed from the vehicle 12.

When the headliner 170 is removed, the support devices 40, inflatable curtain 14, fill tube 22, inflator 24, and housing 26, being connected to the side structure 16 by the push-in fasteners 122, remain installed in the vehicle 12. Thus, if the headliner 170 needs replaced, or if the headliner needs to be removed for maintenance or the like, the side curtain 14 and its related components need not be disturbed.

From the above description of the invention, those skilled in the art will perceive improvements, changes and modifications in the invention. Such improvements, changes and modifications within the skill of the art are intended to be covered by the appended claims.

Having described the invention, the following is claimed:

1. Apparatus comprising:
   a modular headliner assembly for a vehicle having a side structure and a roof, said headliner assembly comprising:
   a headliner;
   an inflatable vehicle occupant protection device inflatable away from the vehicle roof into a position between the side structure of the vehicle and a vehicle occupant;
   a fill tube having a portion located in said inflatable vehicle occupant protection device;

a support device having a portion that clamps around a portion of said fill tube and connects said fill tube and said inflatable vehicle occupant protection device to said support device; and a grab handle having a portion that extends through said headliner and into said support device, said grab handle being releasably interconnected with said support device, said grab handle holding said headliner connected with said support device and said grab handle being releasable to enable removal of said headliner from said support device and said vehicle occupant restraint;

a first connector that connects said support device to the vehicle and initially connects said modular headliner assembly to the vehicle; and a second connector that extends through said support device and said grab handle and fixedly connects said modular headliner assembly to the vehicle.

2. Apparatus as recited in claim 1, wherein said first connector comprises a push-in connector and said second connector comprises a threaded fastener.

3. Apparatus as recited in claim 2, wherein said push-in connector is formed together with said support device as a single piece of molded plastic.

4. Apparatus as defined in claim 1, wherein said inflatable vehicle occupant protection device and said fill tube, when connected to the vehicle, extend along an intersection of the side structure of the vehicle and the vehicle roof.

5. Apparatus as defined in claim 1, further comprising an inflation fluid source that provides inflation fluid for inflating said inflatable vehicle occupant protection device.

6. Apparatus as defined in claim 5, wherein said inflatable vehicle occupant protection device is an inflatable curtain having a stored position extending along the side structure adjacent a roof of the vehicle, said inflatable curtain being inflated away from the vehicle roof into said position between the side structure of the vehicle and a vehicle occupant.

7. Apparatus as defined in claim 6, wherein said inflation fluid source is in fluid communication with said fill tube, said inflation fluid source, when actuated, providing inflation fluid to said fill tube, said fill tube directing said inflation fluid into said inflatable curtain to inflate said inflatable curtain.

8. Apparatus as defined in claim 6, wherein said inflatable curtain, when inflated, extends along the side structure of the vehicle between an A pillar and a C pillar of the vehicle.

9. Apparatus as defined in claim 6, wherein said inflatable curtain, when inflated, overlies at least a portion of an A pillar, a B pillar and a C pillar of the vehicle.

10. Apparatus as defined in claim 6, further comprising a sensor for sensing a vehicle condition for which deployment of said inflatable curtain is desired, said sensor actuating said inflation fluid source to provide inflation fluid to inflate said inflatable curtain.

11. Apparatus as defined in claim 6, wherein said inflation fluid source comprises an inflator that is actuatable to inflate said inflatable curtain.

12. Apparatus as defined in claim 1, wherein said support device removably clamps to said portion of said fill tube.

13. Apparatus as defined in claim 12, wherein said support device includes first and second clamp flanges, said first and second clamp flanges being spaced apart in an open position allowing removal of said support device from said portion of said fill tube, said first and second clamp flanges engaging each other in a closed position securing said support device to said portion of said fill tube.

14. Apparatus as defined in claim 1, wherein said first and second connectors are parallel to each other.

15. Apparatus comprising:

a modular headliner assembly for a vehicle having a side structure and a roof, said headliner assembly comprising:

a headliner;

an inflatable vehicle occupant protection device inflatable away from the vehicle roof into a position between the side structure of the vehicle and a vehicle occupant;

a fill tube having a portion located in said inflatable vehicle occupant protection device;

a support device having a portion adapted to clamp around a portion of said fill tube to connect said fill tube and said inflatable vehicle occupant protection device to said support device; and a grab handle having a portion extendable through said headliner and into said support device, said grab handle being adapted to releasably interconnect with said support device to connect said grab handle and said support device to said headliner;

a first connector for connecting said support device to the vehicle to initially connect said modular headliner assembly to the vehicle;

a second connector extendable through said support device and said grab handle to fixedly connect said modular headliner assembly to the vehicle; and wherein said portion of said grab handle comprises an anchor portion insertable into a fastener receiving portion of said support device, said anchor portion including at least one latch portion that engages said support device to connect said grab handle to said support device.

16. Apparatus as defined in claim 15, wherein said latch portion of said anchor portion extends around a dentation extending from a surface of said fastener receiving portion, said latch portion including a surface that engages said dentation to connect said grab handle to said support device.

17. Apparatus as defined in claim 15, wherein said grab handle has a first end and an opposite second end, an anchor portion extending from each of said first and second ends of said grab handle in a first direction, parallel to each other.

18. Apparatus as defined in claim 17, wherein said anchor portion extending from said first end of said grab handle is insertable into a first support device and said anchor portion extending from said second end of said grab handle is insertable into a second support device.

19. An apparatus for helping to protect an occupant of a vehicle having a side structure and a roof, said apparatus comprising:

a headliner;

an inflatable vehicle occupant protection device inflatable away from the vehicle roof into a position between the side structure of the vehicle and the vehicle occupant;

a fill tube having a portion located in said inflatable vehicle occupant protection device;

a support device having a portion that clamps around a portion of said fill tube;

a grab handle having a portion that extends through said headliner and interconnects with said support device, said grab handle holding said headliner connected with said support device and said grab handle being releasable to enable removal of said headliner from said support device and said vehicle occupant restraint; and a fastener that extends through said grab handle and said support device and connects said grab handle, said support device, said headliner, said fill tube, and said inflatable vehicle occupant protection device to the vehicle.

20. A headliner assembly for a vehicle, said headliner assembly comprising:

a headliner;

an inflatable side curtain;

a fill tube for delivering inflation fluid to said side curtain;

a support device having a portion that clamps around a portion of said fill tube to connect said fill tube and said side curtain to said support device; and a grab handle having a portion that extends through said headliner and into said support device, said grab handle being releasably interconnected with said support device, said grab handle holding said headliner connected with said support device and said grab handle being releasable to enable removal of said headliner from said support device and said vehicle occupant restraint;

a first connector that connects said support device to the vehicle and initially connects said support device, said grab handle, said headliner, said fill tube, and said side curtain to the vehicle; and a second connector that extends through said support device and said grab handle and fixedly connects said support device, said grab handle, said headliner, said fill tube and said side curtain to the vehicle.

21. Apparatus for a vehicle, said apparatus comprising:

a headliner, an inflatable side curtain, and a grab handle assembled together as a module;

a push-in connector for initially connecting said module to the vehicle; and a threaded connector that extends through said grab handle and fixedly connects said module to the vehicle, said threaded connector and said grab handle being removable such that said headliner releases from the vehicle, said push-in connector maintaining said side curtain connected to the vehicle.

22. Apparatus comprising:

a modular headliner assembly for a vehicle having a side structure and a roof, said headliner assembly comprising:

a headliner;

an inflatable vehicle occupant protection device inflatable away from the vehicle roof into a position between the side structure of the vehicle and a vehicle occupant;

a fill tube having a portion located in said inflatable vehicle occupant protection device;

a support device having a portion adapted to clamp around a portion of said fill tube to connect said fill tube and said inflatable vehicle occupant protection device to said support device; and a grab handle having an anchor portion extendable through said headliner and into a fastener receiving portion of said support device, said anchor portion including at least one latch portion that engages said support device to releasably connect said grab handle and said support device to said headliner;

a first connector for connecting said support device to the vehicle to initially connect said modular headliner assembly to the vehicle; and a second connector extendable through said support device and said grab handle to fixedly connect said modular headliner assembly to the vehicle.

* * * * *